(12) United States Patent
Barney et al.

(10) Patent No.: US 10,480,563 B2
(45) Date of Patent: Nov. 19, 2019

(54) FLOATING, BOTTOM-FILLED AND TWIST INSERT AND METHODS FOR USE THEREOF

(71) Applicant: The Boeing Company, Chicago, IL (US)

(72) Inventors: Christopher B. Barney, Everett, WA (US); Lyle J. True, Stanwood, WA (US); Lee James Keetle, Kingston, WA (US)

(73) Assignee: THE BOEING CO., Chicago, IL (US)

( * ) Notice: Subject to any disclaimer, the term of this patent is extended or adjusted under 35 U.S.C. 154(b) by 323 days.

(21) Appl. No.: 15/610,616

(22) Filed: May 31, 2017

(65) Prior Publication Data

US 2017/0268560 A1     Sep. 21, 2017

Related U.S. Application Data

(63) Continuation of application No. 14/797,579, filed on Jul. 13, 2015, now Pat. No. 9,702,394.

(51) Int. Cl.
| | | |
|---|---|---|
| *F16B 5/01* | (2006.01) | |
| *F16B 11/00* | (2006.01) | |
| *B29C 65/54* | (2006.01) | |
| *B29C 65/42* | (2006.01) | |
| *B29C 65/72* | (2006.01) | |

(Continued)

(52) U.S. Cl.
CPC .............. *F16B 37/044* (2013.01); *F16B 5/01* (2013.01); *B29C 65/42* (2013.01); *B29C 65/542* (2013.01); *B29C 65/72* (2013.01); *B29C 66/24221* (2013.01); *B29C 66/301* (2013.01); *B29C 66/30321* (2013.01); *B29C 66/474* (2013.01); *B29C 66/72525* (2013.01); *B32B 3/12* (2013.01)

(58) Field of Classification Search
CPC .. F16B 5/01; F16B 5/02; F16B 37/048; F16B 37/12; F16B 37/122; F16B 37/125; F16B 37/127; F16B 11/006; B29C 65/00; B29C 65/48; B29C 65/481; B29C 65/483; B29C 65/52; B29C 65/524; B29C 65/525; B29C 65/54; B29C 65/542; B29C 65/02; B29C 65/40; B29C 65/42; B29C 65/72; B29C 66/00; B29C 66/24221; B29C 66/301; B29C 66/303; B29C 66/30321; B29C 66/41; B29C 66/43; B29C 66/47; B29C 66/474; B29C 66/725; B29C 66/7252; B29C 66/72525; B29C 66/7254
USPC .. 156/60, 66, 91, 92, 94, 98, 250, 252, 267, 156/293, 295, 297, 298, 305; 411/82, 411/82.1, 103, 107, 108, 258, 432; 52/787.1
See application file for complete search history.

(56) References Cited

U.S. PATENT DOCUMENTS

| | | |
|---|---|---|
| 2,545,045 A | 3/1951 | Rosan |
| 2,722,259 A | 11/1955 | Eckenbeck et al. |

(Continued)

*Primary Examiner* — Philip C Tucker
*Assistant Examiner* — Brian R Slawski
(74) *Attorney, Agent, or Firm* — McDonnell Boehnen Hulbert & Berghoff LLP

(57) ABSTRACT

An insert, a floating nut and methods for use thereof in a panel of an aircraft are presented. Specifically, an insert includes a housing defining a cavity. An aperture is further defined in a first end of the housing and a semi-spherical portion is defined at a second end of the housing. A pair of vent openings are also defined on opposing sides of the first end of the housing.

20 Claims, 15 Drawing Sheets

(51) Int. Cl.
*B29C 65/00* (2006.01)
*B32B 3/12* (2006.01)
*B32B 37/00* (2006.01)
*F16B 37/04* (2006.01)

(56) References Cited

U.S. PATENT DOCUMENTS

| | | | |
|---|---|---|---|
| 3,209,425 | A | 10/1965 | Barry et al. |
| 3,262,480 | A | 7/1966 | Storch |
| 3,339,609 | A * | 9/1967 | Cushman .................. B64C 1/12 |
| | | | 411/82.1 |
| 3,964,531 | A | 6/1976 | Schenk |
| 5,082,405 | A * | 1/1992 | Witten .................... B29C 65/42 |
| | | | 411/178 |
| 5,082,409 | A | 1/1992 | Bias |
| 5,240,543 | A * | 8/1993 | Fetterhoff ................ F16B 5/01 |
| | | | 156/293 |
| 5,378,099 | A | 1/1995 | Gauron |
| 5,632,582 | A | 5/1997 | Gauron |
| 5,713,706 | A * | 2/1998 | Lozano ............... B29C 65/0672 |
| | | | 411/171 |
| 6,238,158 | B1 | 5/2001 | Clements |
| 7,101,135 | B2 | 9/2006 | Hassed |
| 7,195,436 | B1 | 3/2007 | Stephen |
| 2004/0265091 | A1* | 12/2004 | Cheung .................. B29C 65/54 |
| | | | 411/338 |
| 2011/0220267 | A1* | 9/2011 | Blancaneaux .......... C08L 63/00 |
| | | | 156/78 |
| 2016/0001501 | A1* | 1/2016 | Kogl .................... F16B 13/141 |
| | | | 156/66 |

* cited by examiner

FLOATING, BOTTOM-FILLED AND TWIST INSERT AND METHODS FOR USE THEREOF

CROSS-REFERENCE TO RELATED APPLICATION

This application claims the benefit of the filing date of U.S. Non-Provisional patent application Ser. No. 14/797,579, filed Jul. 13, 2015, which is hereby incorporated by reference in its entirety.

FIELD

The disclosure generally relates to mounts and fasteners and, more particularly, to an insert for use with interior panels for aircraft.

BACKGROUND

Sandwich panels are used extensively in the aircraft and marine industries. These sandwich panels typically are made of fiberglass or similar material formed in a honeycomb structure. The honeycomb structure is then typically sandwiched between outer layers of aluminum panels or the like. These sandwich panels may be used as interior panels of the aircraft. In order to anchor objects to the sandwich panel, inset panel fasteners are typically used.

Many types of mounting devices have been developed for holding one or more objects to a support surface. For example, inset-type fasteners are generally anchored into a structure and include an engagement portion, such as the male or female threads of a screw, for securing objects to the structure. Inset fasteners are particularly useful when a strong connection between the structure and object cannot be readily obtained through use of a surface mounted structure. Most inset panel fasteners include a cylindrical barrel having a central bore. The central bore typically includes female threads functioning as a fastener element. Alternatively, some inset panel fasteners include a floating fastener element in the form of a nut which also includes female threads which is floatingly positioned within the bore. A flange is typically arranged at the base of these floating nuts. In addition, the inset panel fastener may be coupled to a flexible tab intended to stick to and hold the insert flush within a sandwich panel and to prevent adhesive from leaking onto the exterior of the panel.

To anchor the inset panel fastener in place, a cavity is typically formed directly through the outer layer (e.g., an aluminum layer) into the honeycomb core using a drill, for example. The inset panel fastener may then be positioned within the cavity and an adhesive or other binding material may be injected into the cavity to secure the fastener to the honeycomb core. Alternatively, adhesive may be injected into the cavity of the panel first and the inset fastener may then be pressed into the cavity of the sandwich panel.

The tab typically has pressure sensitive adhesive to removably adhere to the skin of the sandwich panel. This tab adhesive may be weak and fail due to surface irregularity or contaminants on the skin. The tab may be too flexible, permitting the inset panel fastener to sit above or below the surface of the panel or at an angle within the cavity of the sandwich panel. Further, due to the shape of the insert and installation techniques, if the inset panel fastener is positioned too deep within the cavity of the panel, mark-off may show through on a decorative side of the sandwich panel creating a visual defect. For example, the flat bottom and cylindrical shape of the inset panel fastener may act like a piston during installation forcing itself and/or the adhesive against the bottom of the panel cavity. In addition, during adhesive injection, the adhesive may overflow, spilling over the tab and onto the sandwich panel surface. Still further, after the adhesive has set, a scraper may be required to separate the tabs from the inset panel fastener and sandwich panel.

In addition, the floating fastener element typically has a thread locking design that may create problems with thread engagement and galling of the threads. The thread locking design may also lead to stress concentration that may result in cracking of the nut when a screw element is introduced into the nut.

SUMMARY

An insert, a floating nut and methods for use thereof in a panel of an aircraft are disclosed herein. The advantages of the embodiments in the present disclosure may include, but are not limited to, improved adhesive flow characteristics and seal with respect to the insert and the cavity of the panel, improved insert flushness within a cavity of a panel, reduced panel mark-off on the panel, increased containment of adhesive during insert installment and therefore a cleaner exterior surface of an interior panel, increased floating nut strength, decreased floating nut weight and reduced thread locking defects for the floating nut.

In a first aspect of the disclosure, an insert includes a housing defining a cavity, an aperture defined in a first end of the housing, a semi-spherical portion defined at a second end of the housing and a pair of vent openings defined on opposing sides of the first end of the housing. In one embodiment, the insert may include a threaded floating nut disposed within the cavity of the housing. This threaded nut may define a flange at a first end and define a through-hole aligned with the aperture of the housing.

In a second aspect of the disclosure, methods for installing the insert in a panel of an aircraft are also disclosed herein. One method includes providing an insert that comprises (a) a housing defining a cavity, (b) an aperture defined in a first end of the housing, (c) a semi-spherical portion defined at a second end of the housing, (d) a pair of vent openings defined on opposing sides of the first end of the housing and (e) a pair of receptacles coupled to the first end of the housing, wherein each of the pair of receptacles have sidewalls defining a through-hole aligned with one of the pair of vent openings. Next, the insert is installed in a cavity of a panel for an aircraft and advanced until the pair of receptacles rests against an exterior of a skin of the panel. Adhesive is then injected into one of the pair of vent openings. The adhesive then flows around the housing until the adhesive exits the cavity via the other one of the pair of vent openings.

Another method includes providing an insert that comprises (a) a housing defining a cavity, (b) an aperture defined in a first end of the housing to the cavity, (c) a semi-spherical portion defined at a second end of the housing, (d) a pair of vent openings defined on opposing sides of the first end of the housing and (e) a second aperture defined in a second end of the housing and aligned with a central axis of the spherical portion. Next, the insert is installed in a cavity of a panel for an aircraft. Then, a tip of an adhesive gun is placed through the first aperture and the cavity of the housing to the second aperture of the housing. An adhesive is then injected underneath the spherical portion of the insert. The adhesive then flows around the housing until the adhesive exits the cavity of the panel via the pair of vent openings.

A further method includes providing an insert that comprises (a) a housing defining a cavity, (b) an aperture defined in a first end of the housing, (c) a semi-spherical portion defined at a second end of the housing, (d) a pair of vent openings defined on opposing sides of the first end of the housing and (e) a pair of helical grooves defined on the exterior of the spherical portion of the housing. An adhesive is then injected into a cavity of a panel of an aircraft. Next, the insert is installed in the cavity of the panel. Then, the adhesive flows around the housing and along the pair of helical grooves until the adhesive exits the cavity of the panel via the pair of vent openings.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein.

Corresponding parts are marked with the same reference symbols in all figures.

Figure 1:
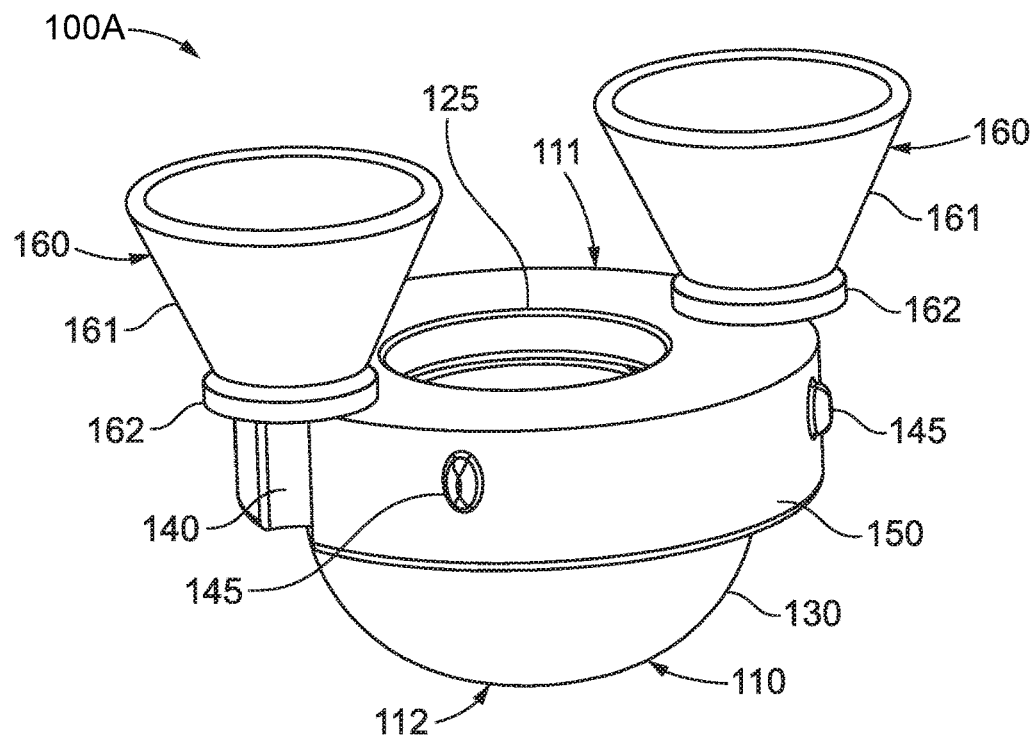
FIG. 1 is a diagrammatic representation of a perspective view of an insert, according to one example embodiment.
Figure 2:
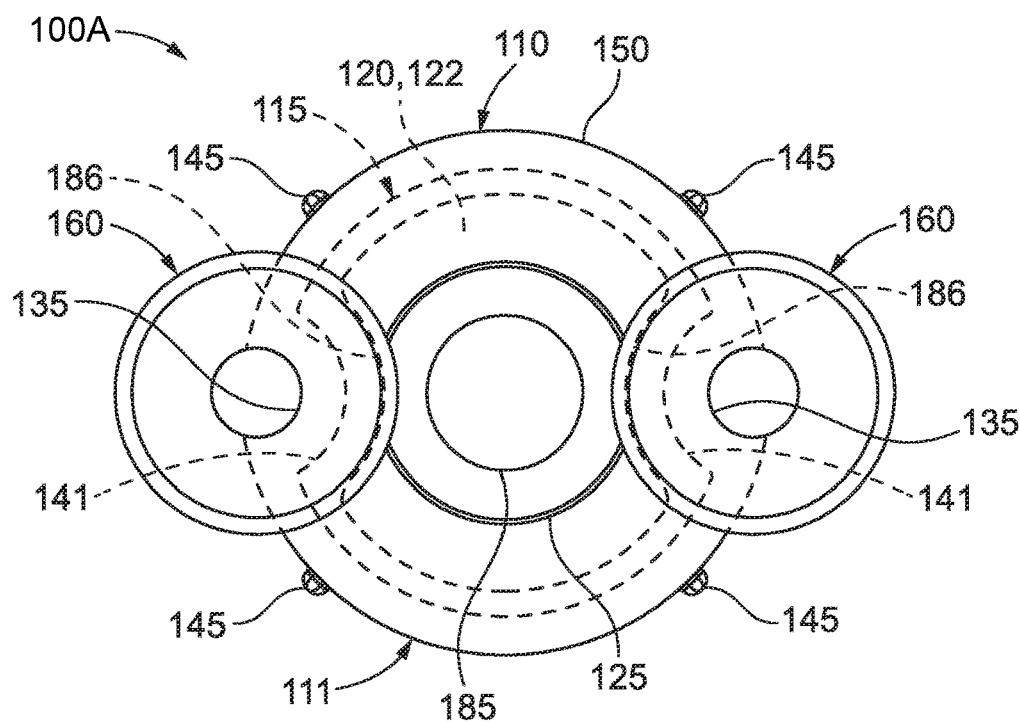
FIG. 2 is a diagrammatic representation of a top view of an insert, including a floating nut, according to the embodiment of FIG. 1.
Figure 3:
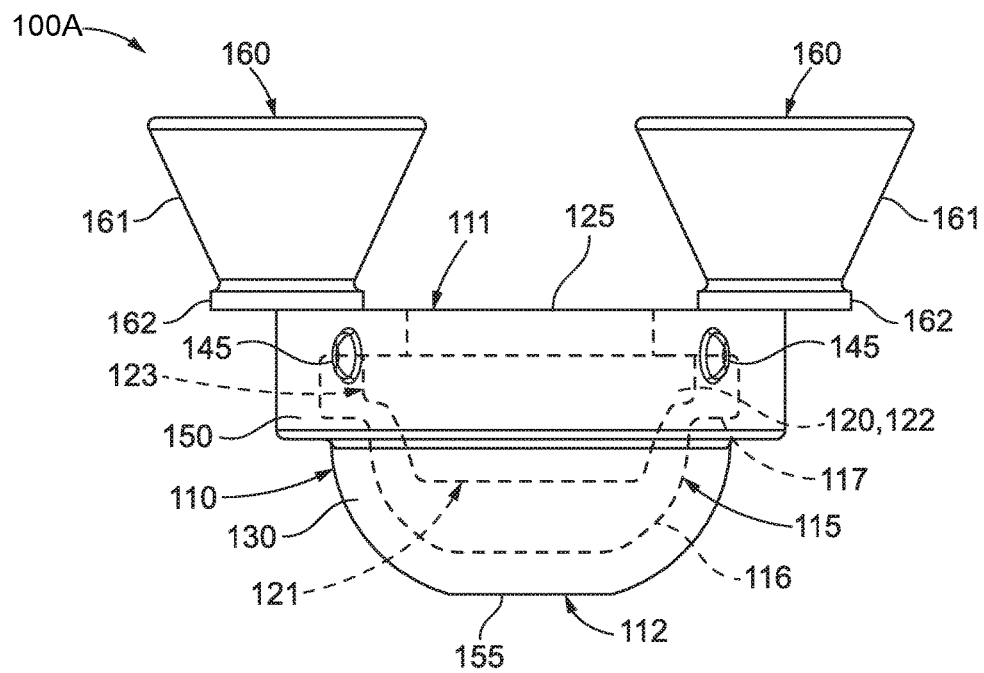
FIG. 3 is a diagrammatic representation of a side view of an insert, including a floating nut, according to the embodiment of FIG. 1.
Figure 4:
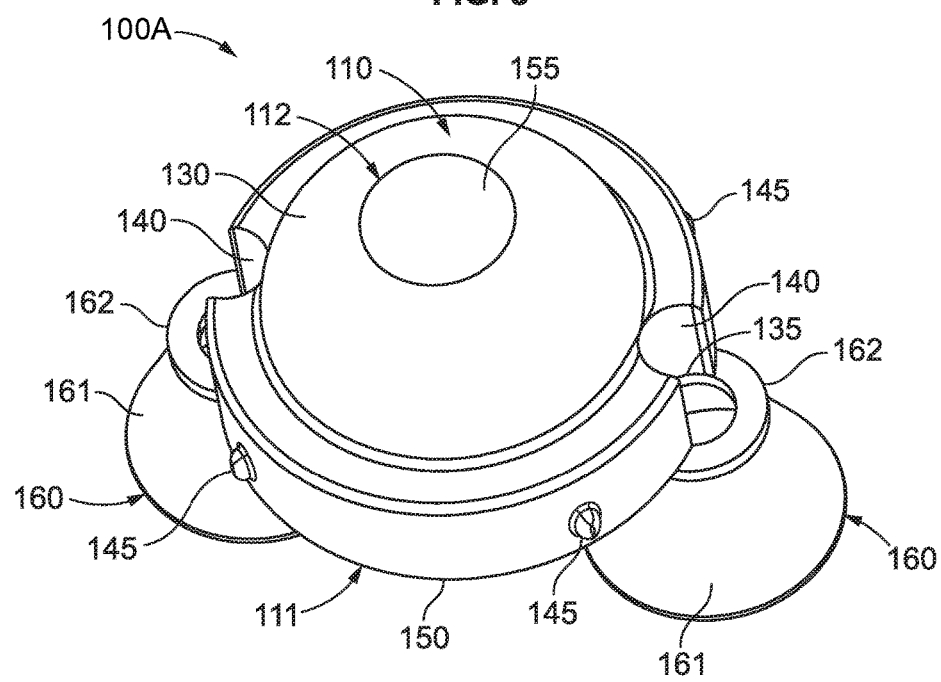
FIG. 4 is a diagrammatic representation of a bottom perspective view of an insert according to the embodiment of FIG. 1.

The drawings are provided for the purpose of illustrating example embodiments, but it is understood that the inventions are not limited to the arrangements and instrumentalities shown in the drawings.

DETAILED DESCRIPTION

Figure 22:
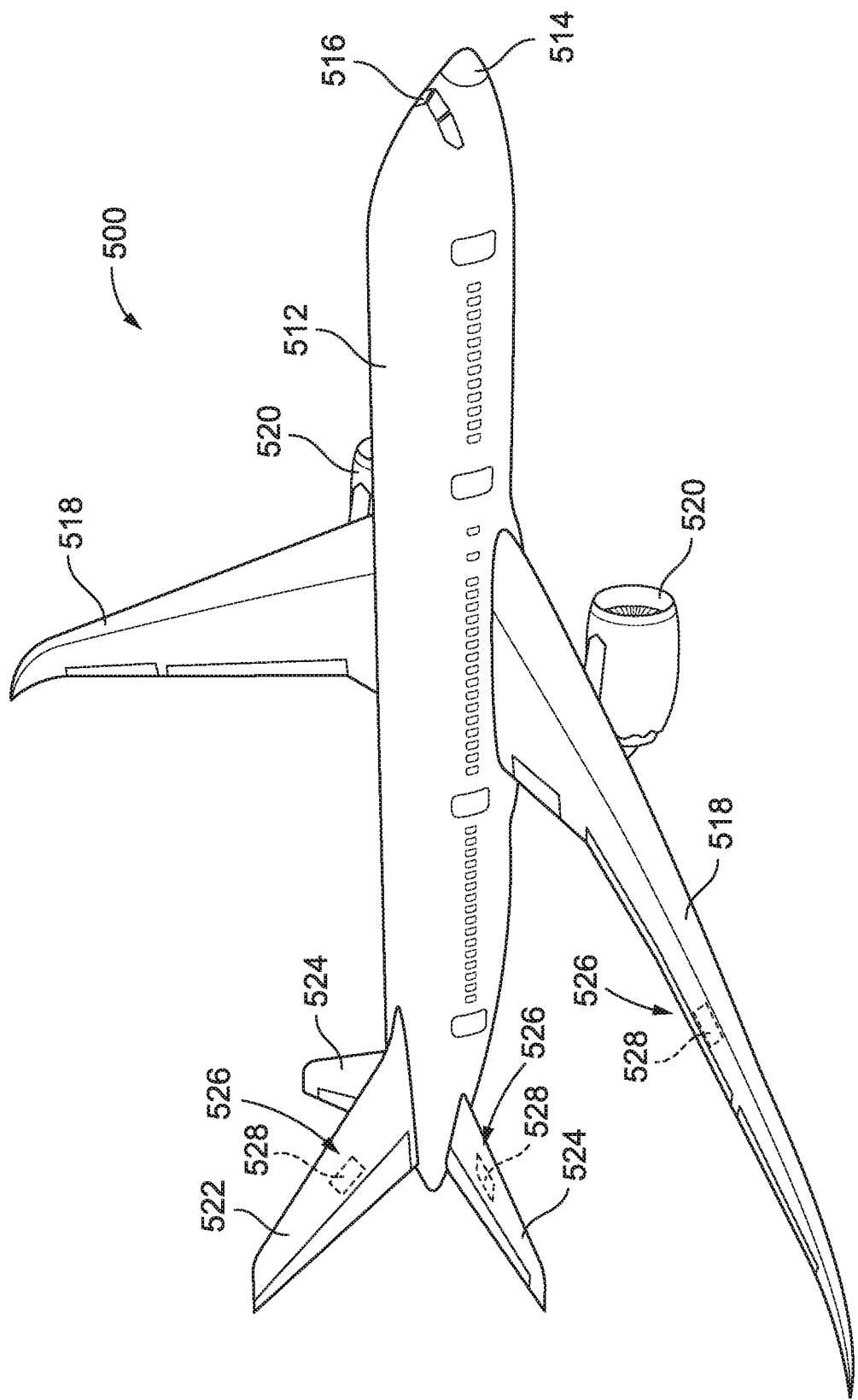
FIG. 22 is a diagrammatic representation of a perspective view of an aircraft that may incorporate one or more inserts in accordance with one or more embodiments disclosed herein.

FIGS. 1-17 depict an insert 100A, B, C, D for installation in a panel 105 (see FIG. 5) for an aircraft (see FIG. 22). A panel 105 refers to structural sandwich panels that are known building components, both in respect of conventional structures and in aircraft fabrication; the latter being a particularly relevant environment within the context of the present disclosure. The popularity of these panels is attributable to a relatively high strength-to-weight ratio.

Figure 5:
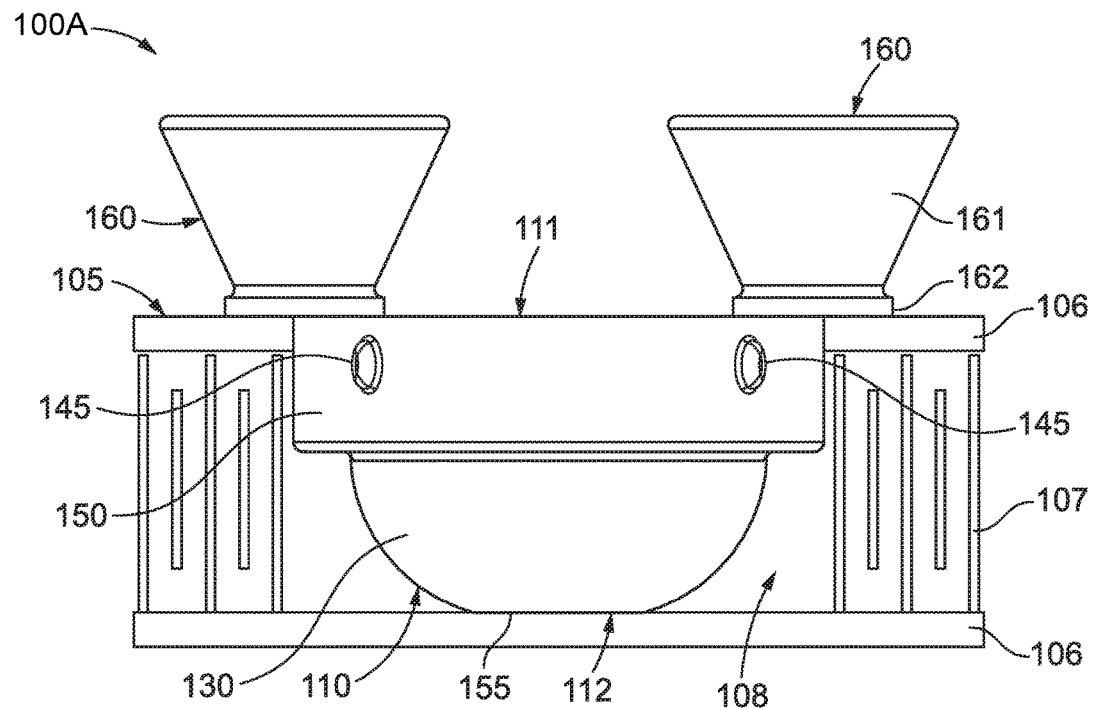
FIG. 5 is a diagrammatic representation of a side view of an insert according to the embodiment of FIG. 1, disposed in a cavity of a panel.

With reference to FIG. 5, the sandwich panels of interest are comprised of a pair of relatively thin face sheets or skins 106 separated by and bonded or otherwise secured to an intermediate, foraminous or honeycomb member 107 of relatively thicker dimension. The skins 106 serve to distribute a load through the hone ember 107 to the supporting structure. Depending upon the anticipated loads to which the panel 105 will be subjected, a variety of materials may be utilized and certain variations in the structural conformation of the honeycomb member 107 may be employed. For example, metals, polymeric resins, and impregnated fibrous materials have all been utilized in the past in this regard.

To anchor the insert 100A, B, C, D in place, a cavity 108 is typically formed directly through the skin 106 into the honeycomb member 107 using a drill, for example. The insert 100A, B, C, D may then be positioned within the cavity 108 and an adhesive or other binding material may be injected into the cavity 108 to secure the insert 100 to the honeycomb member 107. The insert 100A, B, C, D of the present disclosure may advantageously be used with interior panel 105 for an aircraft.

With reference to FIGS. 1-5, the insert 100A includes a housing 110 having a first end 111 and a second end 112. The housing 110 defines a cavity 115 that may be sized and shaped to accommodate a floating nut 120 described in detail below. For example, the cavity 115 may have a lower portion 116 configured to accommodate a second end 121 of the floating nut 120 and a shoulder 117 to support a flange 122 at the first end 123 of the floating nut 120 and to keep the second end 121 of the floating nut 120 from contacting the housing 110. The housing 110 may have a two-piece construction mechanically joined together along a seam (not shown) via welding, such as a sonic weld, or via adhesive, for example, to permit placement of the floating nut 120 into the cavity 115. In addition, the two-piece housing may be joined together via a mechanical interface such as by clips having cooperating male and female components. Still further, the seam of the two-piece housing should be defined at a location to aid injection molding and manufacturing of the housing.

The insert 100A further includes an aperture 125 defined in the first end 111 of the housing 110. The aperture 125 is configured to permit access to the cavity 115 and may be sized and shaped to receive one or both of a tip of an adhesive gun or male threaded fastening component such as a screw.

The insert 100A also includes a semi-spherical portion 130 defined at a second end 112 of the housing 110. This second end 112 is intended to be placed in the cavity 108 of the panel 105 first such that the first end 111 of the insert housing 110 faces out of the panel 105. The semi-spherical portion 130 may permit improved adhesive flow characteristics and seal with respect to the insert 100A and the cavity 108 of the panel 105 by permitting an outward potting flow as discussed below with respect to method 200. The semi-spherical portion 130 may also reduce panel mark-off on a decorative side of the panel 105 by reducing the foot print of the second end 112 of the insert 100A.

Still further, the insert 100A includes a pair of vent openings 135 defined on opposing sides of the first end 111 of the housing 110. During installation of the insert 100A in a panel 105, the vent openings 135 may permit excess adhesive to exit the cavity 108 defined in the panel 105. In one embodiment, the vent openings 135 may be configured to receive the tip of an adhesive gun or other implement for adhesive injection, as described below with respect to method 200.

In one embodiment, the insert 100A may further include a pair of longitudinally extending channels 140 defined on opposing sides of the first end 111 of the housing 110 and coupled to the pair of vent openings 135. These channels 140 may help support the tip of an adhesive gun or other implement and may further help direct the adhesive out of the vent openings 135 during installation. In one embodiment, the interior side 141 of the longitudinally extending channels may protrude into the cavity 115 of the housing 110 to act as stops to prevent the floating nut 120 from rotating when a male member, such as a screw, is joined with the floating nut 120, as described below.

The insert 100A may also include a plurality of retention protuberances 145 coupled to and extending radially from the first end 111 of the housing 110. These retention protuberances 145 may be nubs capable of slight deformation to pass by a skin 106 (e.g., the skin 106 which receives the insert 100A, as represented by the upper skin 106 in FIG. 5) of the panel 105. During installation, the retention protuberances 145 may provide tactile feedback to the operator indicating the insert 100A is at a proper depth within the cavity 108 of the panel 105. The retention protuberances 145 may also prevent the insert 100 from backing out of the panel 105 in response to pressure from the adhesive.

Referring now to FIGS. 1-11, the insert 100A, B, C may further include a cylindrical portion 150 at the first end 111 of the housing 110. The cylindrical portion 150 may have a diameter the same as or slightly smaller than the diameter of the cavity 108 defined in the panel 105. In one embodiment, the diameter of the cavity 108 may be 0.001 inches larger than the diameter of the insert, but one of skill in the art would appreciate that a larger tolerance may be used in view of the adhesive flow that may fill any gap during installation. In one embodiment, the cylindrical portion 150 of the housing 110 may have a larger diameter than the spherical portion 130 of the housing 110, similar to a flange.

The insert 100A, B, C may include a planar flat 155 defined on the spherical portion 130 of the second end 112 of the housing 110 and arranged opposite to the aperture 125. This planar flat 155 advantageously reduces the foot print of the insert 100A, B, C associated with any mark-off that may occur on the panel skin 106 during installation of the insert 100A, B, C. The planar flat 155 may also enable the insert to beneficially stand upright to aid in the use of vibratory bowls and other automated feeding systems.

Figure 6:
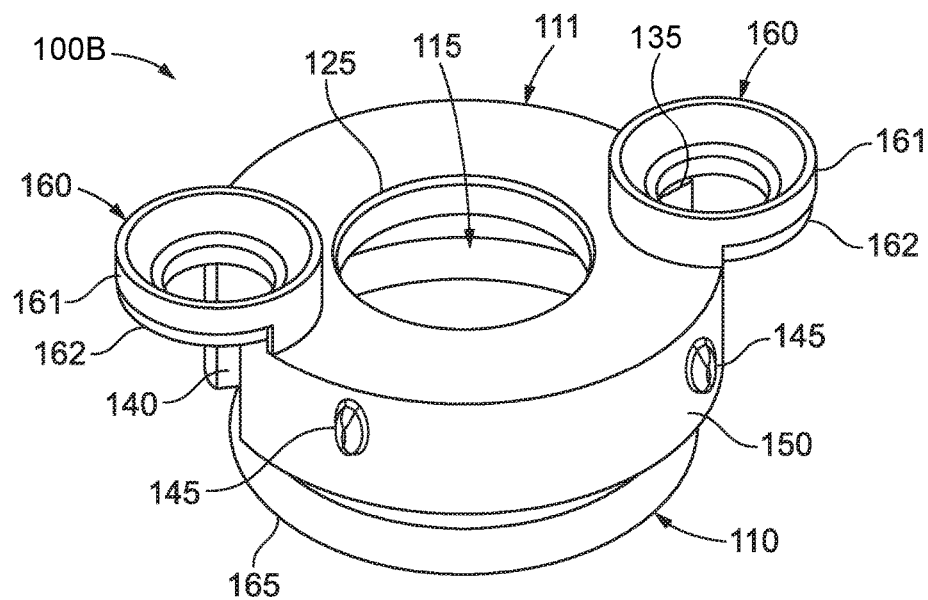
FIG. 6 is a diagrammatic representation of a perspective view of an insert according to a second example embodiment.
Figure 7:
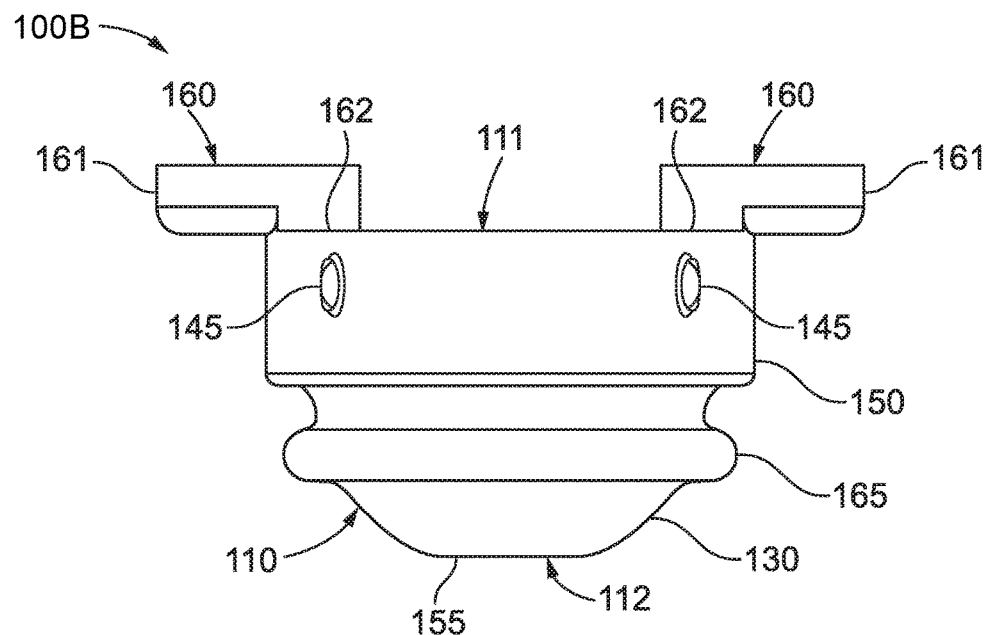
FIG. 7 is a diagrammatic representation of a side view of an insert according to the embodiment of FIG. 6.
Figure 8:
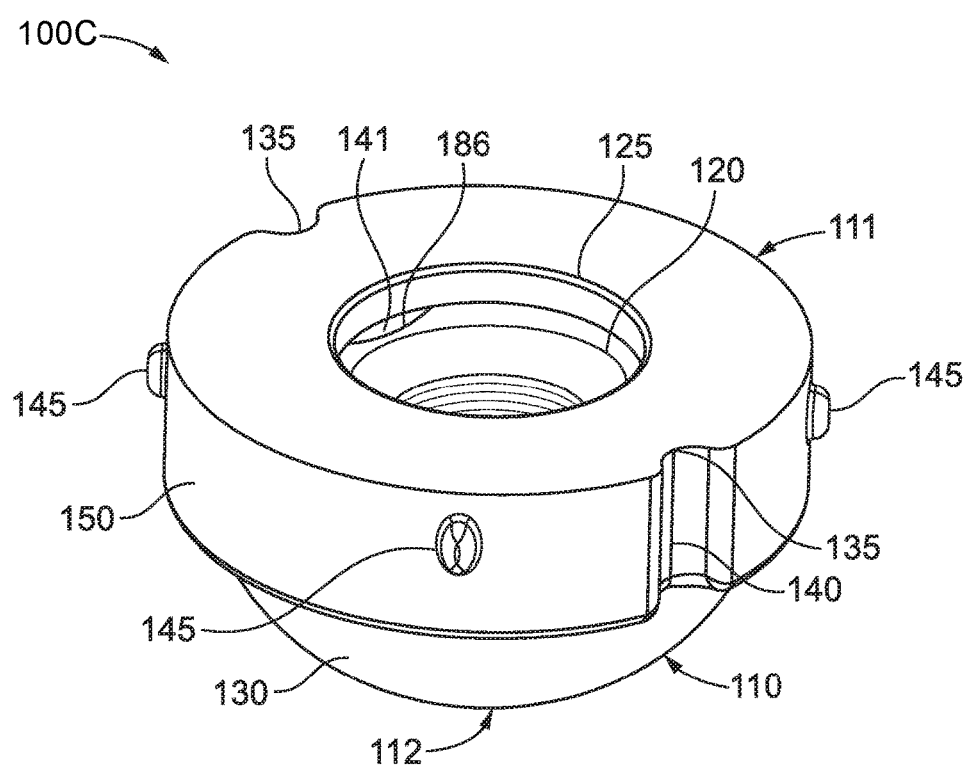
FIG. 8 is a diagrammatic representation of a perspective view of an insert according to a third example embodiment.
Figure 9:
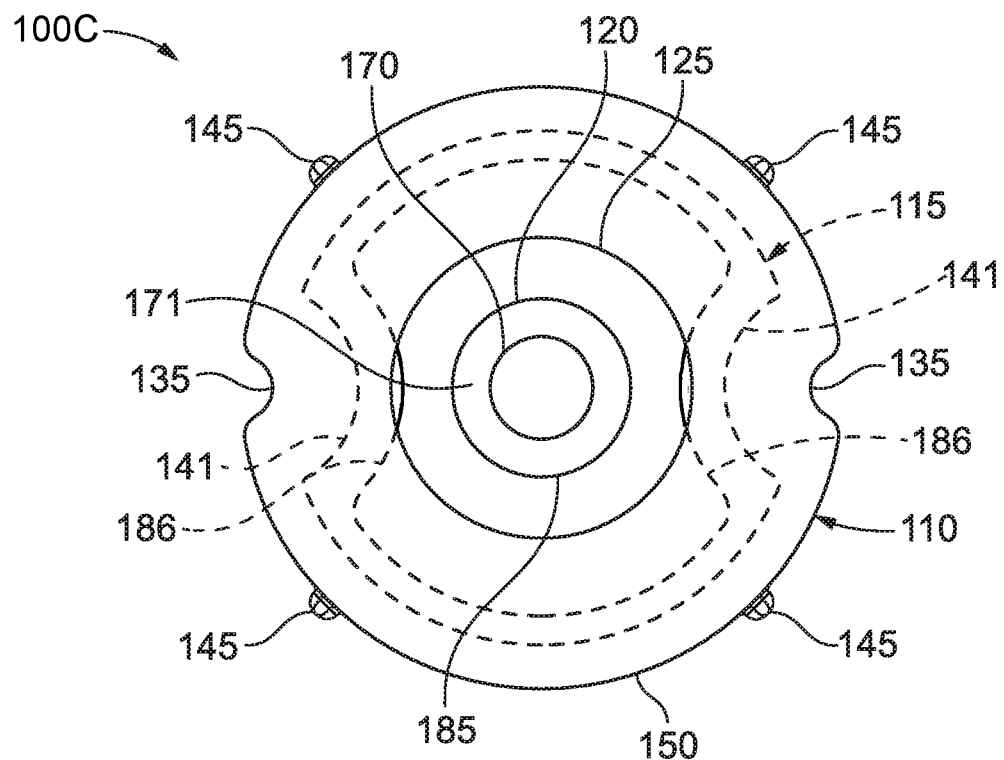
FIG. 9 is a diagrammatic representation of a top view of an insert, including a floating nut, according to the embodiment of FIG. 8.
Figure 10:
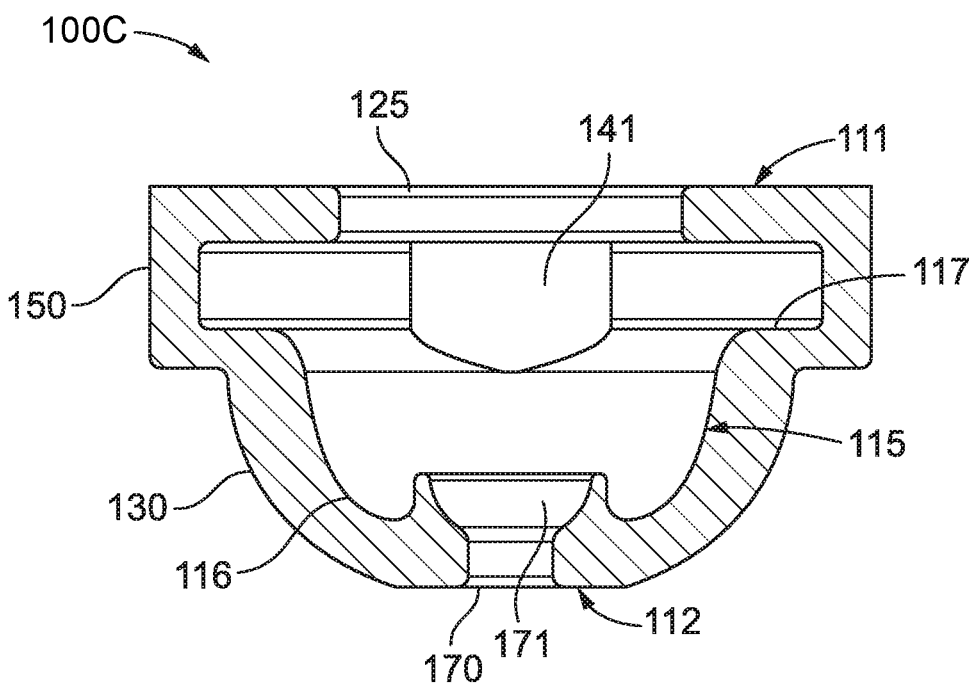
FIG. 10 is a diagrammatic representation of a side cross-sectional view of an insert according to the embodiment of FIG. 8.
Figure 11:
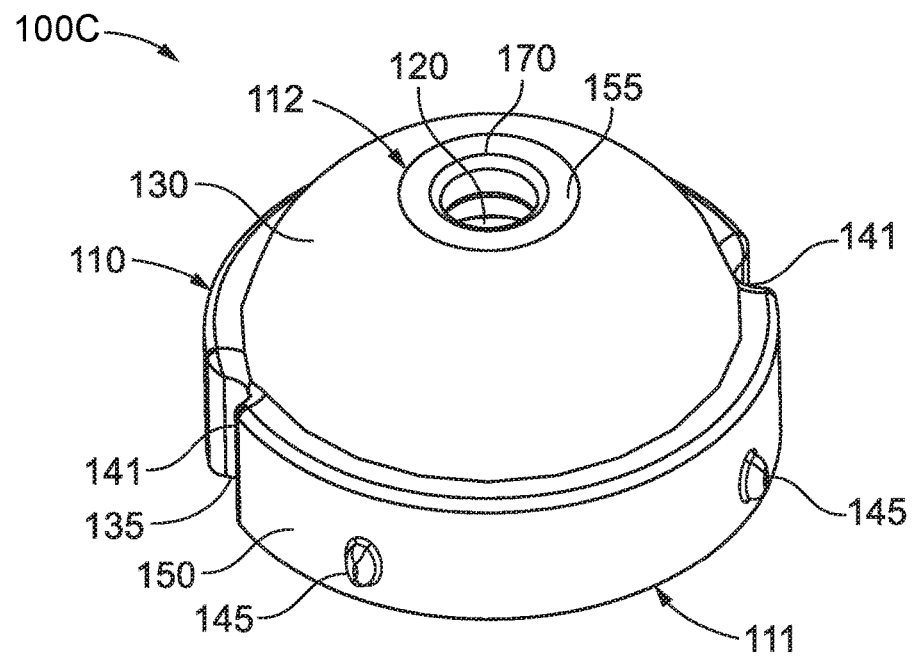
FIG. 11 is a diagrammatic representation of a bottom perspective view of an insert, including a floating nut, according to the embodiment of FIG. 8.

With reference to FIGS. 1-7, the insert 100A, B may include a pair of receptacles 160 coupled to the first end 111 of the housing 110. Each of the pair of receptacles 160 may have sidewalls 161 defining a through-hole aligned with one of the pair of vent openings 135. In one embodiment, the base 162 of each of the pair of receptacles 160 may extend radially from the first end of the housing 110 such that the receptacles 160 overhang the housing 110 and the base 162 may act as indexing surfaces against the skin 106 of the panel 105. In another embodiment, the sidewalls 161 of each of the pair of receptacles 160 may extend away from the housing to capture any adhesive that overflows during installation. In another embodiment, the sidewalls 161 of the pair of receptacles 160 may be shaped like cones (FIGS. 1-5). In one embodiment, the sidewalls 161 of the pair of receptacles 160 may be shaped like shallow cylindrical cups (FIGS. 6-7). The receptacles 160 may be shaped to accommodate the tip of an adhesive gun or implement. In addition, during installation, the base 162 of each receptacle 160 may be used to prevent the insert 100A, B from extending too far into the panel 105. The receptacles 160 may also capture adhesive exiting the cavity 108 of the panel 105 during adhesive injection, thereby preventing the adhesive from spilling over onto the surface of the skin 106. In a further embodiment, the pair of receptacles 160 may be configured to breakaway from the housing 110 via a thinned section or a weakened perforated coupling at the base 162.

Referring now to FIGS. 6-7 (which shows another embodiment of the insert 100B), the insert 100B may also include an annular protuberance 165 projecting radially from the spherical portion 130 of the housing 110. This annular protuberance 165 may increase the bond strength between the panel 105 and the insert 100B, acting as an anchor about which the adhesive may flow and set.

With respect to FIGS. 8-11, which illustrate yet another embodiment, the insert 100C may include a second aperture 170 defined in the second end 112 of the housing 110 and aligned with a central axis of the spherical portion 130. The first aperture 125, housing cavity 115 and second aperture 170 together define a through-hole in the housing 110. In one embodiment, the second aperture 170 may extend into the cavity 115 of the housing 110 and may define a receptacle 171 facing the first end 111 of the housing 110. This receptacle 171 may be configured to receive the tip of an adhesive gun or similar implement to aid in the injection of adhesive.

Referring now to FIGS. 12-17, which illustrate yet a further embodiment, the insert 100D may include a pair of helical grooves 175 defined on the exterior of the spherical portion 130 of the housing 110. The helical grooves 175 may permit pre-injected adhesive near the center of the cavity to advance upward when the insert 100D is installed, without the adhesive first having to advance downward or radially, thereby relieving internal pressure in the panel 105. In one embodiment, each of the pair of helical grooves 175 may be coupled to one of the pair of vent openings 135 to direct adhesive flow out of the cavity of panel to relieve back pressure from adhesive injection.

Figure 12:
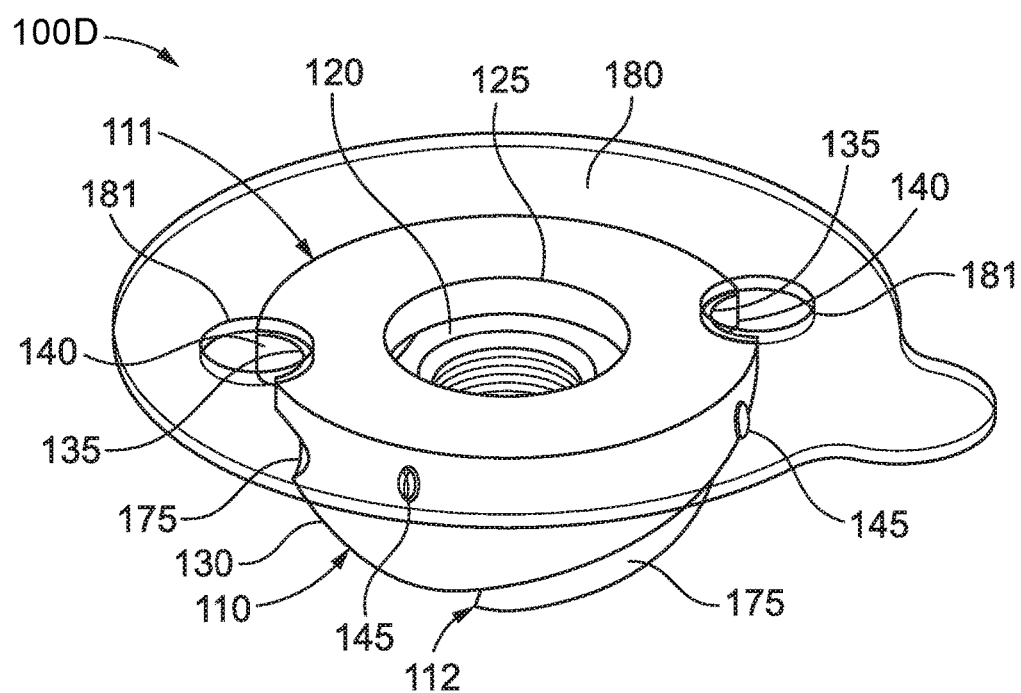
FIG. 12 is a diagrammatic representation of a perspective view of an insert, according to a fourth example embodiment.
Figure 13:
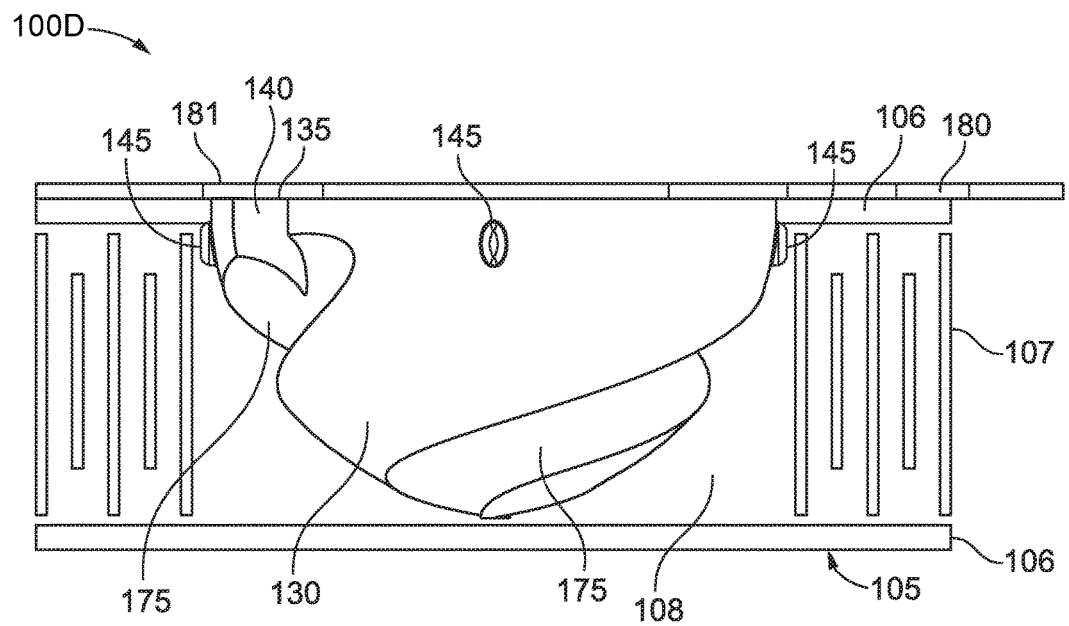
FIG. 13 is a diagrammatic representation of a side view of an insert according to the embodiment of FIG. 12, disposed in a cavity of a panel.
Figure 14:
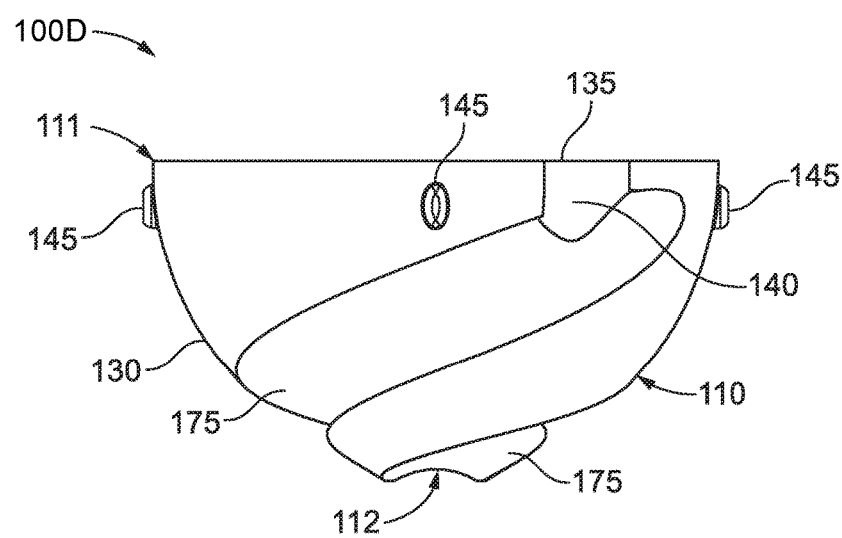
FIG. 14 is a diagrammatic representation of a side view of an insert according to the embodiment of FIG. 12.
Figure 15:
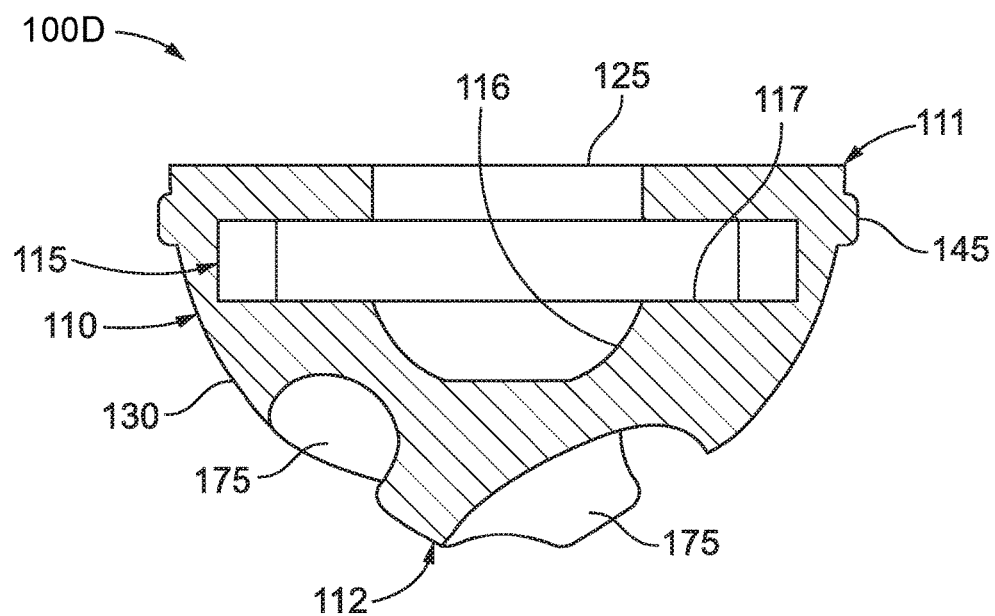
FIG. 15 is a diagrammatic representation of a side cross-sectional view of an insert according to the embodiment of FIG. 12.
Figure 16:
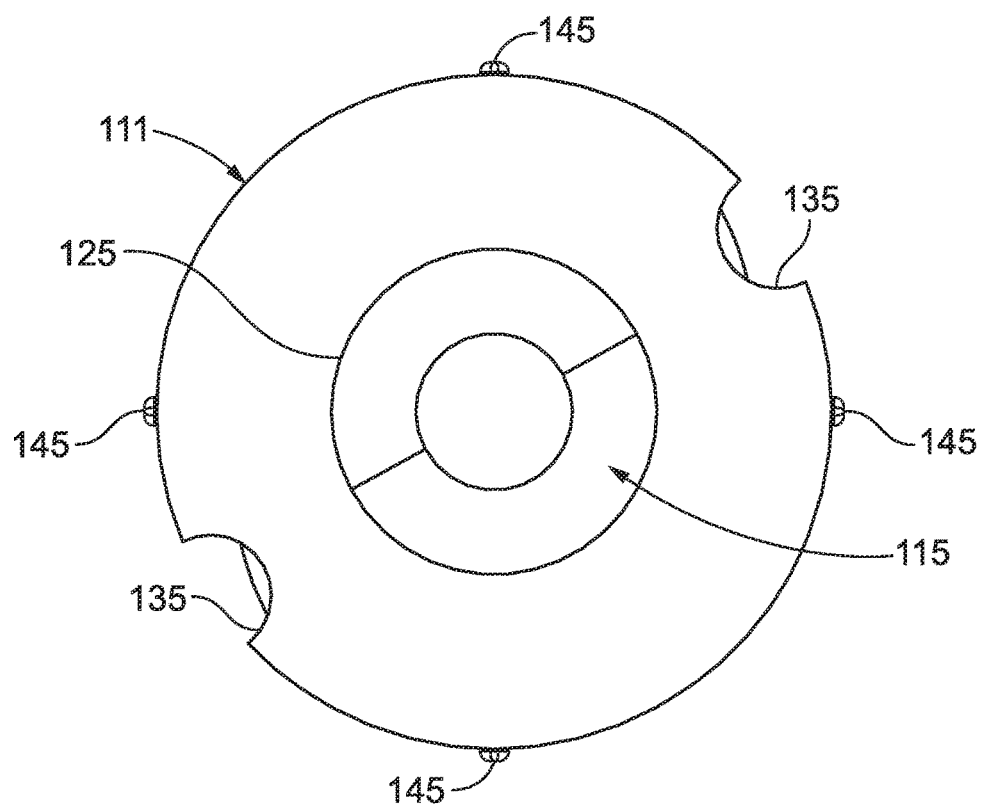
FIG. 16 is a diagrammatic representation of a top view of an insert according to the embodiment of FIG. 12.
Figure 17:
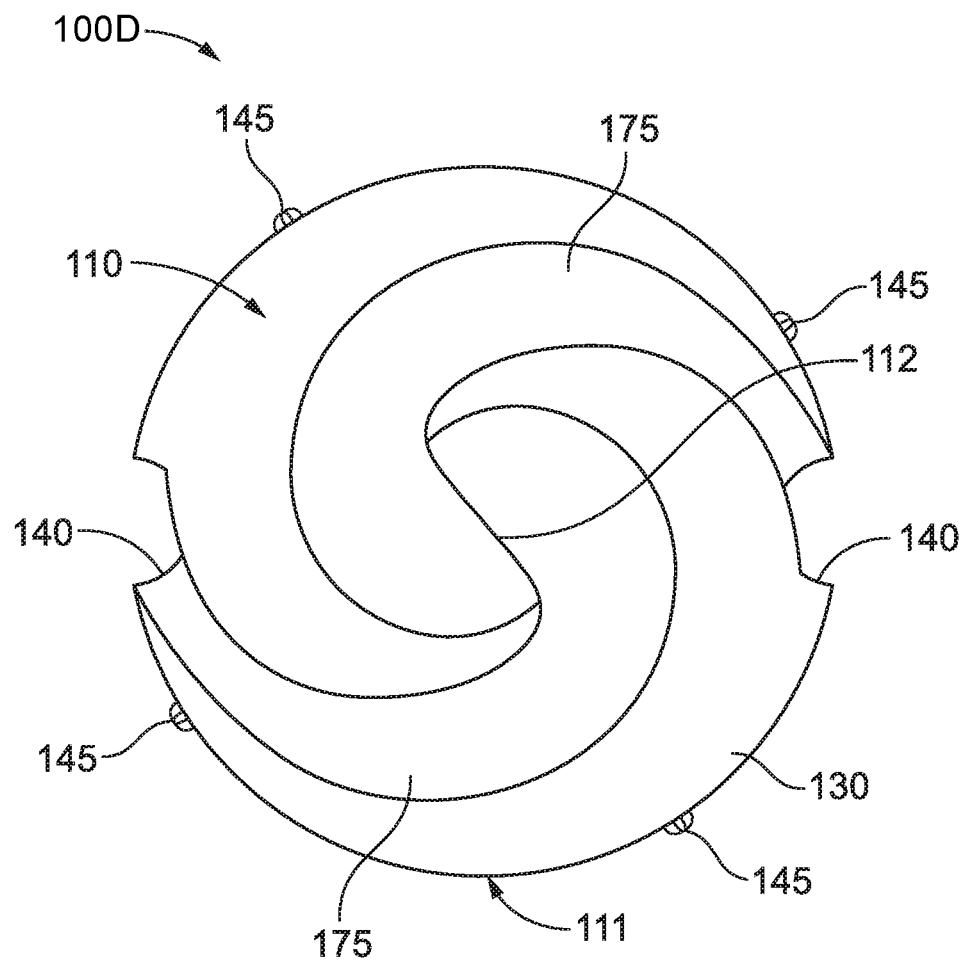
FIG. 17 is a diagrammatic representation of a bottom view of an insert according to the embodiment of FIG. 12.
Figure 18A:
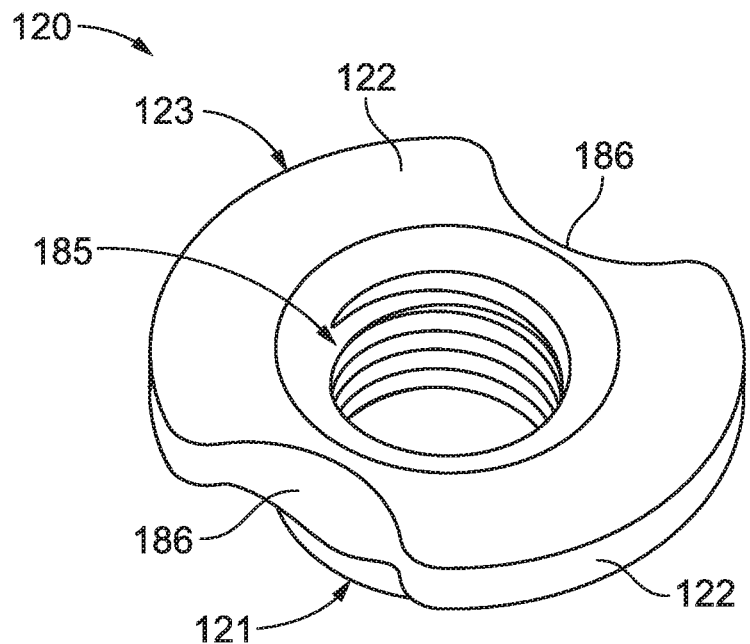
FIG. 18A is a diagrammatic representation of a top perspective view of a floating nut, according to one embodiment.
Figure 18B:
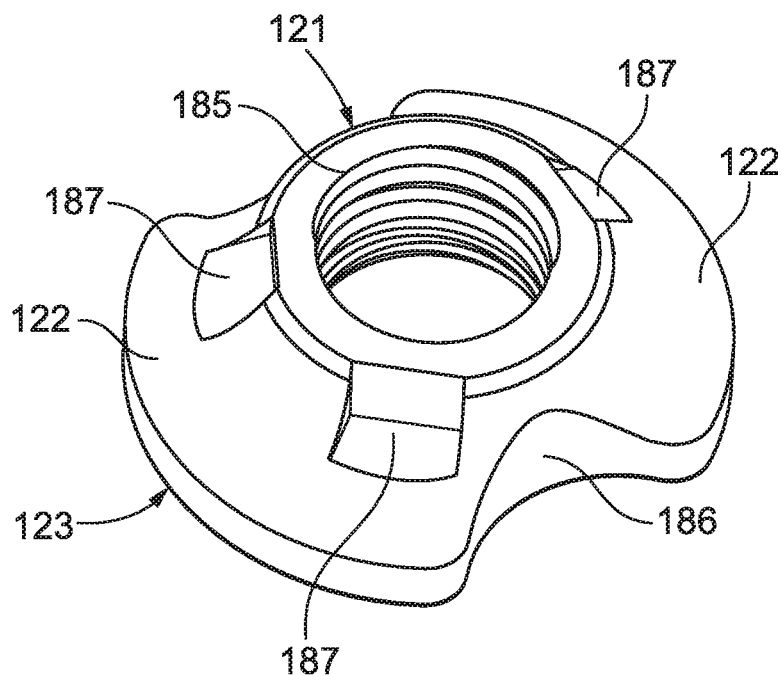
FIG. 18B is a diagrammatic representation of a bottom perspective view of a floating nut according to the embodiment of FIG. 18A.

As shown in FIGS. 12-13, in one embodiment, the insert 100D may include a rigid tab 180 coupled to the first end 111 of the housing 110. The rigid tab 180 may have two openings 181 configured to align with and surround the vent openings 135 of the insert 100D. The tab 180 may have a thickness ranging from 0.025 inches to 0.25 inches and may be made of any rigid plastic or metal material, for example. These dimensions and materials may provide the tab with sufficient rigidity to not deform or flex when the insert is installed in the panel 105. This helps prevent the insert 100 from being pressed too deeply into the panel 105, thereby preventing mark-off on the panel skin 106. In various embodiments, the rigid tab may be used in place of the pair of receptacles and vice versa.

In another embodiment, shown in FIGS. 2-3, 8-9, 11-12, 18A-18B, as discussed above, the insert 100A, B, C, D may include a threaded floating nut 120 disposed within the cavity 115 of the housing 110. The floating nut 120, best seen in FIGS. 18A-B, defines a flange 122 at a first end 123 and defines a through-hole 185 aligned with the aperture of the housing 110. The floating nut 120 has an inverted orientation relative to the housing 110, when compared to other known floating nuts for inset fasteners. Inverting the load-transmitting flange 120 in this manner may permit the nut height to be shortened, reducing the total weight of the insert 100 A, B, C, D. In one embodiment, the flange 122 defines a pair of grooves 186 on opposing sides of the floating nut aligned with the pair of longitudinally extending channels 140 of the housing 110. The grooves 186 on the flange 122 of the floating nut 120 are sized and shaped to accommodate the interior side 141 of the longitudinally extending channels 140 of the housing 110 that protrude into the cavity 108 of the housing 110 to act as stops to prevent the floating nut 120 from rotating when a male member, such as a screw, is joined with the floating nut 120. In another embodiment, threads defined at a second end 121 of the nut 120 may be deformed due depressions 187. These depressions 187 may be caused by application of pressure to a plurality of points around the second end 121 of the nut 120. In use, the depressions 187 may increase frictional forces acting on a male coupling member (not shown), like a screw, thereby preventing the male coupling member from backing out of the threads of the floating nut 120 once the male coupling member has advanced past the second end 121 of the floating nut 120.

Figure 19:
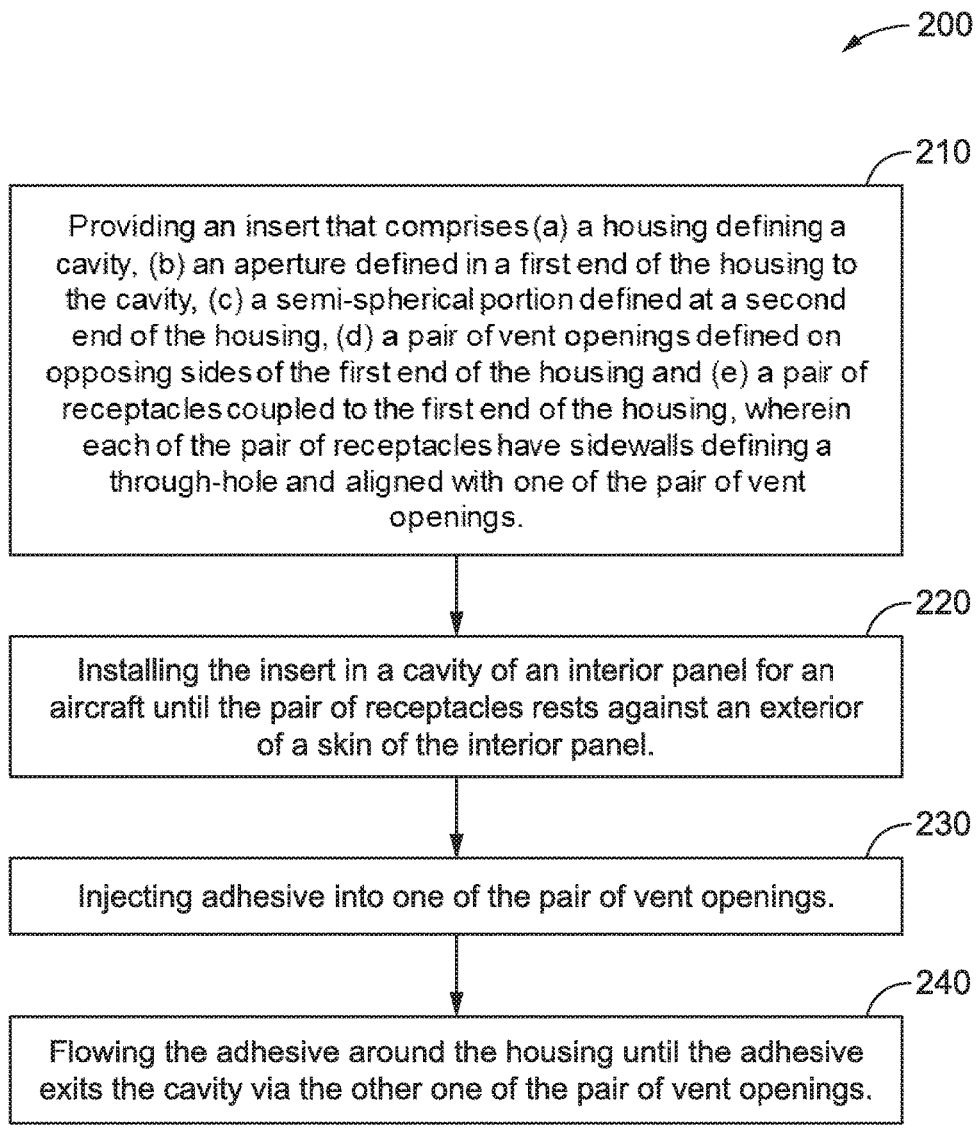
FIG. 19 is a flow diagram of a method for installing an insert into a panel for an aircraft, according to one example embodiment.

The second aspect of the invention provides methods for installing an insert 100A, B, C, D into a panel 105 of an aircraft. In one embodiment shown in FIG. 19, a method 200 may include, at block 210, providing an insert 100A, B that comprises (a) a housing 110 defining a cavity 115, (b) an aperture 125 defined in a first end 111 of the housing 110, (c) a semi-spherical portion 130 defined at a second end 112 of the housing 110, (d) a pair of vent openings 135 defined on opposing sides of the first end 111 of the housing 110 and (e) a pair of receptacles 160 coupled to the first end 111 of the housing 110, wherein each of the pair of receptacles 160 have sidewalls 161 defining a through-hole aligned with one of the pair of vent openings 135. Then, at block 220, the insert 100A, B is installed in a cavity 108 of a panel 105 for an aircraft and advances until the pair of receptacles 160 rests against an exterior of a skin 106 of the panel 105 (see FIG. 5). In one embodiment, the spherical portion 130 may define a planar flat 155 that may rest against the bottom of the cavity 108 of the panel 105 during installation.

Next, at block 230, adhesive is injected into one of the pair of vent openings 135. Adhesive will typically be injected via an adhesive gun or other implement having a tip that fits within one of the pair of receptacles 160 or pair of vent openings 135. And, at block 240, adhesive flows around the housing 110 until the adhesive exits the cavity 108 via the other one of the pair of vent openings 135. Application of the adhesive in this manner may permit an outward potting flow with pressure directed radially rather than primarily against the bottom of the cavity 108 of the panel 105. This may beneficially help reduce mark-off on the decorative surface of the panel 105.

With respect to an insert 100A, B that has a plurality of retention protuberances 145 coupled to and extending radially from the first end 111 of the housing 110, method 200's step of installing the insert in the cavity 108 of the panel 105 for the aircraft may include snapping the retention nubs 145 past the exterior of the skin 106 to the cavity 108 of the panel 105, in one embodiment. This arrangement may advantageously prevent the insert 100 from backing out of the cavity 108 of the panel 105 in response to the pressure from the adhesive flow.

In another embodiment, after adhesive has been injected, method 200 may include the application of a force to the pair of receptacles 160 to separate the pair of receptacles 160 from the housing 110, as described below with respect to method 400.

Figure 20:
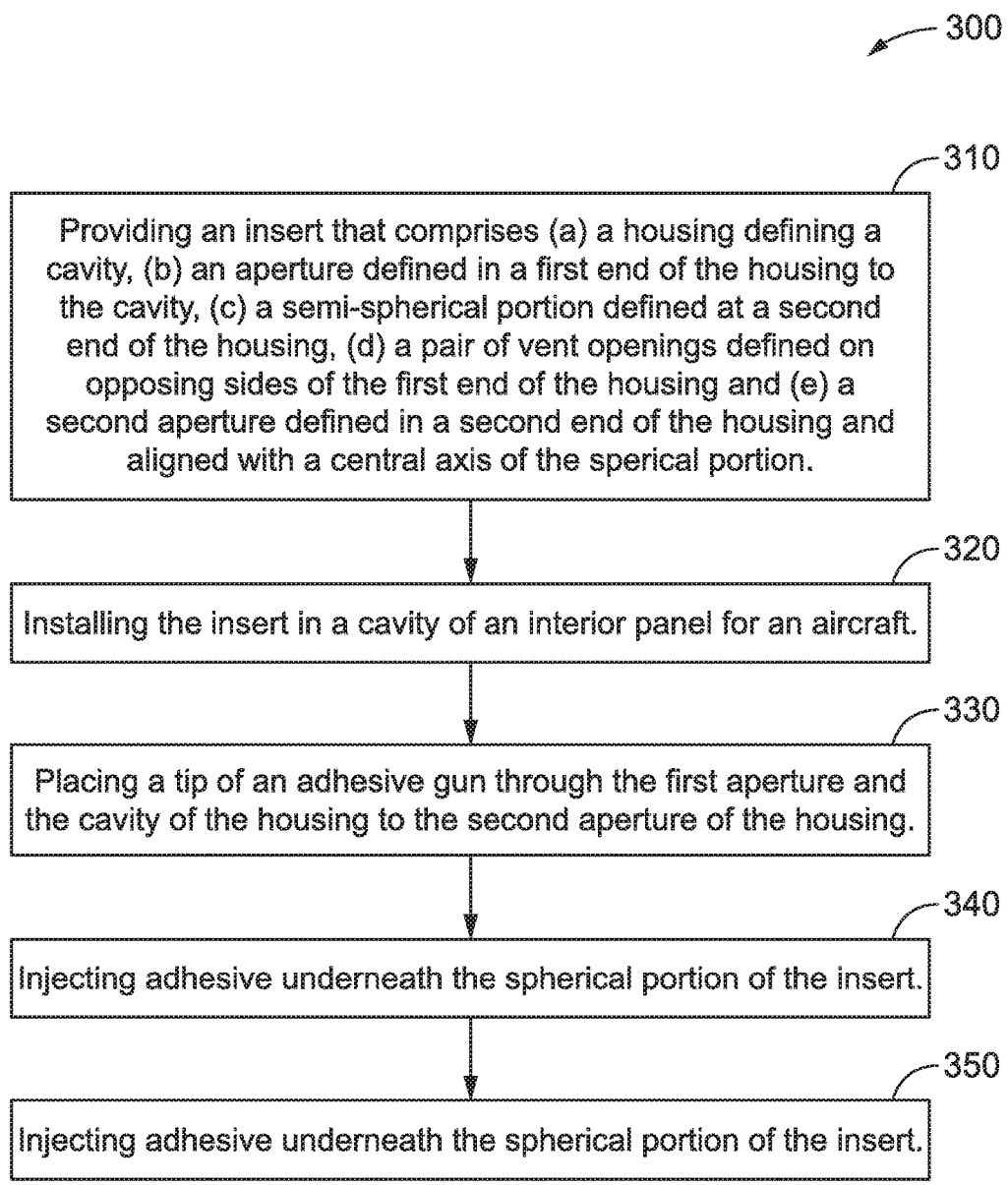
FIG. 20 is a flow diagram of a method for installing an insert into a panel for an aircraft, according to one example embodiment.

Referring now to FIG. 20, method 300 includes, at block 310, providing an insert 100C that comprises (a) a housing 110 defining a cavity 108, (b) an aperture 125 defined in a first end 111 of the housing 110, (c) a semi-spherical portion 130 defined at a second end 112 of the housing 110, (d) a pair of vent openings 135 defined on opposing sides of the first end 111 of the housing 110 and (e) a second aperture 170 defined in a second end 112 of the housing 110 and aligned with a central axis of the spherical portion 112. Then, at block 320, the insert 100C is installed in a cavity 108 of a panel 105 for an aircraft. For example, the insert 100C may include a rigid tab 180 or a pair of receptacles 160 coupled to the first end 111 of the housing 110. During installation, the insert 100C may be pressed into the cavity 108 until the rigid tab 180 or the pair of receptacles 160 rest against an exterior of a skin 106 of the panel 105, such that the second end 112 of the insert 100C is spaced apart from the bottom of the cavity 108 of the panel 105 to permit adhesive flow through the second aperture 170.

Next, at block 330, a tip of an adhesive gun is placed through the first aperture 125 and the cavity 115 of the housing 110, and extend towards the second aperture 170 of the housing 110. In one embodiment, the tip of the adhesive gun may engage a receptacle defined by the second aperture 170 (see FIG. 10). Then, at block 340, adhesive is injected underneath the spherical portion 130 of the insert 100C. This adhesive is then flowed around the housing 110 until the adhesive exits the cavity 108 of the panel 105 via the pair of vent openings 135, at block 350.

With respect to an insert 100C that has a plurality of retention protuberances 145 coupled to and extending radially from the first end 111 of the housing 110, method 300's step of installing the insert 100C in the cavity 108 of the panel 105 for the aircraft may include snapping the retention nubs 145 past the exterior of the skin 106 to the cavity 108 of the panel 105, in one embodiment. This arrangement may advantageously prevent the insert 100C from backing out of the cavity 108 of the panel 105 in response to the pressure from the adhesive flow.

In another embodiment, the insert 100C may include a rigid tab 180 or a pair of receptacles 160 coupled to the first end 111 of the housing 110. And method 300 may include the steps of applying a force to either the rigid tab 180 or the pair of receptacles 160 and separating the rigid tab 180 or the pair of receptacles 160 from the housing 110, as described below with respect to method 400.

Figure 21:
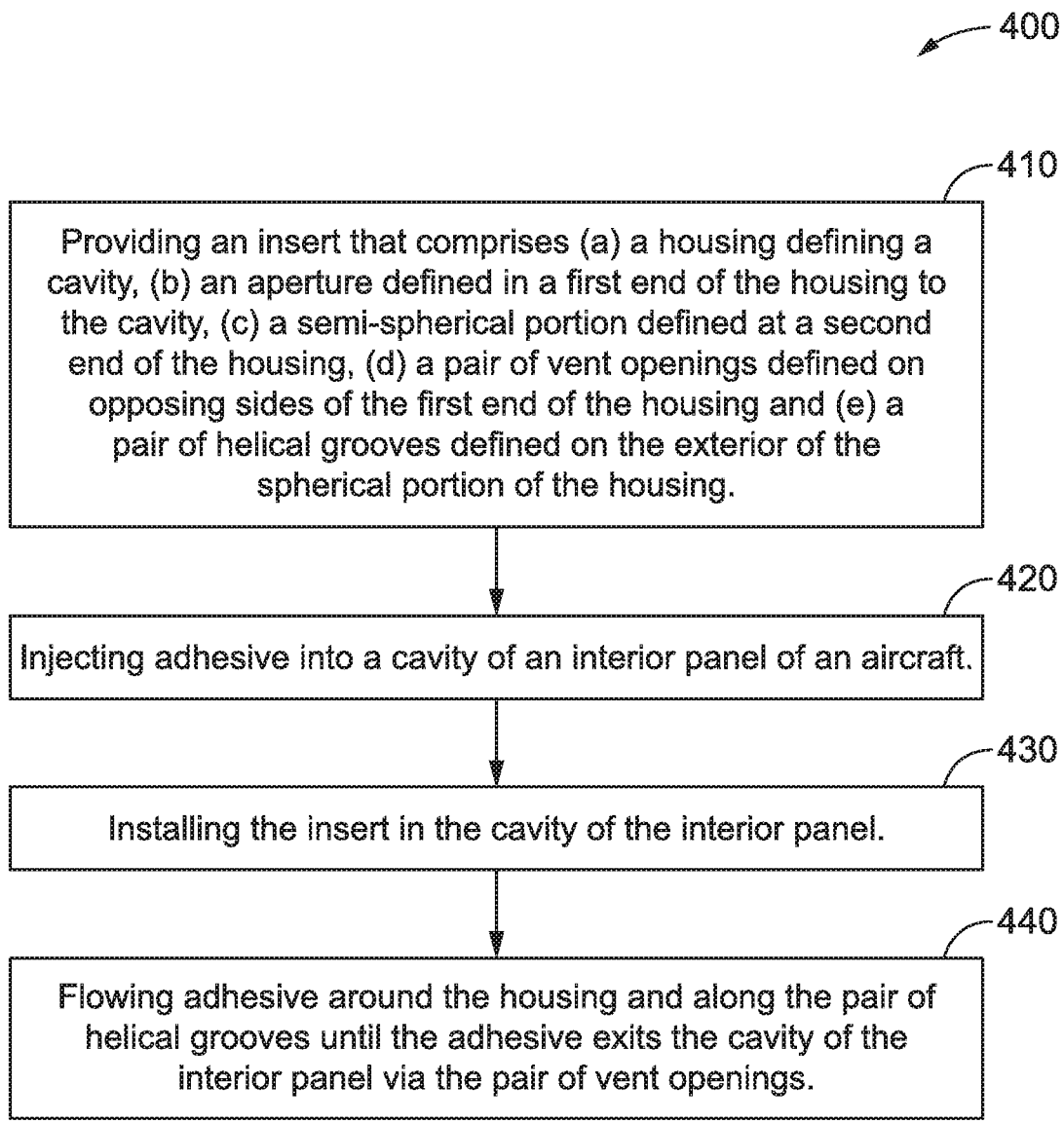
FIG. 21 is a flow diagram of a method for installing an insert into a panel for an aircraft, according to one example embodiment.

Referring now to FIG. 21, method 400 includes, at block 410, providing an insert 100D that comprises (a) a housing 110 defining a cavity 115, (b) an aperture 125 defined in a first end 111 of the housing 110, (c) a semi-spherical portion 130 defined at a second end 112 of the housing 110, (d) a pair of vent openings 135 defined on opposing sides of the first end 111 of the housing 110 and (e) a pair of helical grooves 175 defined on the exterior of the spherical portion 130 of the housing 110 (see e.g., FIGS. 12-17). Next, at block 420, adhesive is injected into a cavity 108 of a panel 105 of an aircraft. The amount of adhesive may be predetermined based upon the both the volume of the cavity 108 of the panel 105 and the volume of the insert 100D itself. Alternatively, the adhesive may fill the cavity to a predetermined height. Further, the amount of adhesive used may be larger than the volume of the cavity 108 remaining after the insert 100D is in place, to prevent voids in the adhesive between the panel 105 and the insert 100D. In addition, overfilling the cavity 108 may cause the adhesive to spill out of the pair of vent openings 135 signaling to an installer that the insert 100D has been properly seated within the cavity 108 (see block 440).

Then, at block 430, an insert 100D is installed in the cavity 108 of the panel 105. In one embodiment, a rigid tab 180 may be coupled to the first end 111 of the insert's housing 110 and the insert 100D may be installed by pressing the insert 100D into the cavity 108 of the panel 105 until the rigid tab 180 rests against an exterior of a skin 106 of the panel 105. In another embodiment, a pair of receptacles 160 may be coupled to the first end 111 of the insert's housing 110 and each of the pair of receptacles 160 may have sidewalls 161 defining a through-hole and aligned with one of the pair of vent openings 135. In this embodiment, the insert 100D may be installed by pressing the insert 100 into the cavity 108 of the panel 105 until the pair of receptacles 160 rests against an exterior of a skin 106 of the panel 105. In a further embodiment, the insert 100D may be twisted during installation into the cavity 108 of the panel 105. The twisting action may help guide the adhesive along the pair of helical grooves 175. In another embodiment, an insert 100D may have a plurality of retention protuberances 145 coupled to and extending radially from the first end 111 of the housing 110, and method 400's installation step 430 may include snapping the retention nubs 145 past the skin 106 of the panel 105 to the cavity 108 of the panel 105, in one embodiment.

At block 440, adhesive flows around the housing 110 and along the pair of helical grooves 175 until the adhesive exits the cavity 108 of the panel 105 via the pair of vent openings 135. The helical grooves 175 may permit the adhesive near the center of the cavity 108 to advance upward without first having to advance downward or radially, thereby relieving internal pressure in the panel 105.

In one embodiment, the method 400, after the adhesive has set in the cavity 108 of the panel 105, may further include applying a force to the underside of the rigid tab 180 and then separating the tab 180 from the housing 110. The force may be applied to the rigid tab 180 or to the pair of receptacles 160 using a scraper. This action severs the adhesive bond between the rigid tab 180 and the exterior of the panel skin 106 and first end 111 of the housing 110, for example. In an alternative embodiment, a force may be applied to the pair of receptacles 160, thereby separating the receptacles 160 from the insert's housing 110. The scraper may also sever a thinned section between the pair of receptacles 160 and the first end 111 of the housing 110, such that the pair of receptacles 160 and excessive adhesive, break away from the insert housing 110. Alternatively, the force may be applied against the sidewalls 161 of the pair of receptacles 160, rotating the receptacles 160 and severing the thinned section between the pair of receptacles 160 and the first end 111 of the housing 110.

FIG. 22 is an illustration of a perspective view of an aircraft 500 that may incorporate one or more composite laminates manufactured by one of the embodiments of the present disclosure. As shown in FIG. 22, the aircraft 500 comprises a fuselage 512, a nose 514, a cockpit 516, wings 518 operatively coupled to the fuselage 512, one or more propulsion units 520, a tail vertical stabilizer 522, and one or more tail horizontal stabilizers 524. Although the aircraft 500 shown in FIG. 22 is generally representative of a commercial passenger aircraft, the one or more inserts, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles formed from or utilizing the inserts as disclosed herein.

Figure 23:
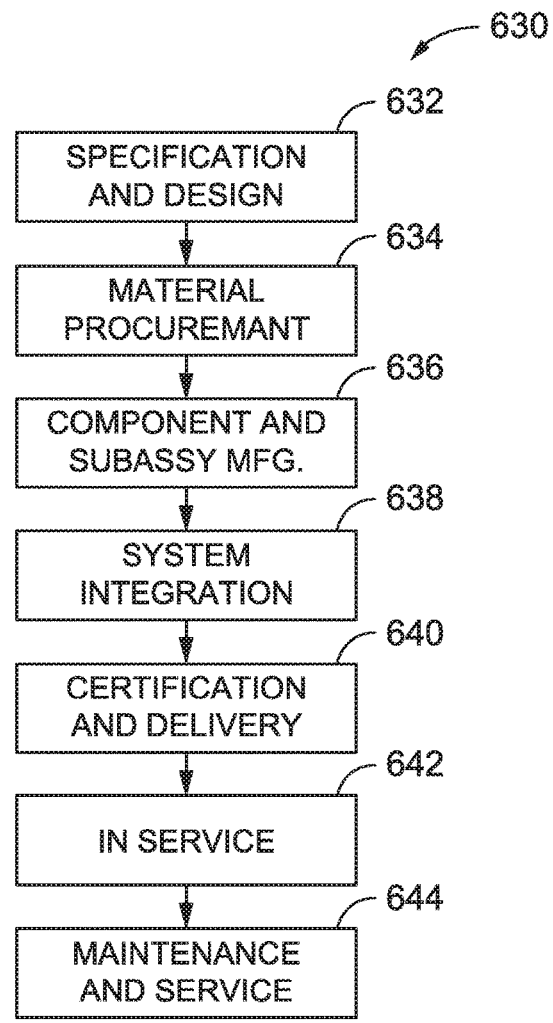
FIG. 23 is a flow diagram of an embodiment of an aircraft production and service method of the disclosure.
Figure 24:
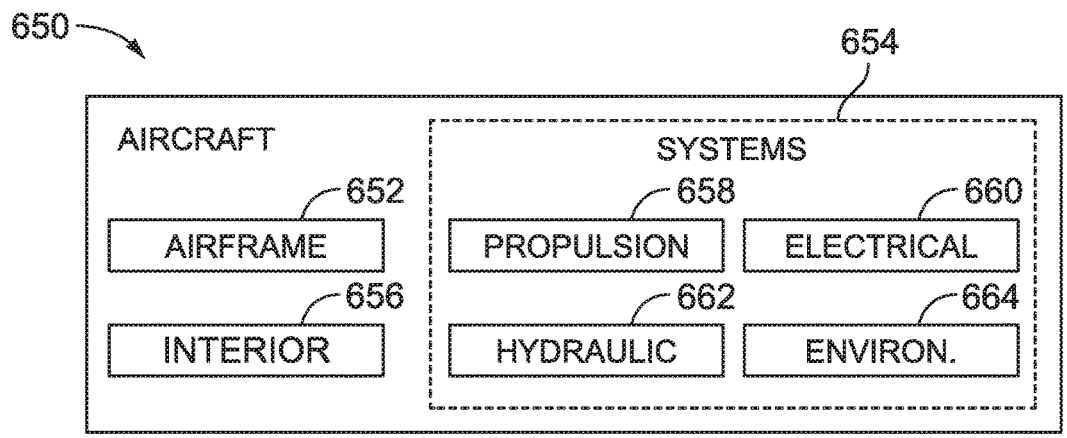
FIG. 24 is a functional block diagram of an aircraft.

Embodiments of the disclosure may find use in a variety of potential applications, particularly in the transportation industry, including for example, aerospace, marine, automotive applications and other application where the one or more inserts may be used. Therefore, referring now to FIGS. 23-24, embodiments of the disclosure may be used in the context of an aircraft manufacturing and service method 630 as shown in FIG. 23 and an aircraft 650 as shown in FIG. 24. Aircraft applications of the disclosed embodiments may include, for example, without limitation, the design of inserts and methods for installation thereof as disclosed herein.

During pre-production, exemplary method 630 may include specification and design 632 of the aircraft 650 and material procurement 634. As just one example, for the specification and design of the aircraft-related inserts 100, floating nuts 120, panels 105 and methods 200, 300, 400 disclosed herein, may be determined at this step.

During production, component and subassembly manufacturing 636 and system integration 638 of the aircraft 650 takes place. As explained in greater detail above, FIGS. 1-18 illustrate preferred types of inserts 100A, B, C, D for assembling a panel 105 for the aircraft 650 in accordance with one aspect of the present disclosure. After such a component and subassembly manufacturing step, the aircraft 650 may go through certification and delivery 640 in order to be placed in service 642. While in service by a customer, the aircraft 650 is scheduled for routine maintenance and service 644, which may also include modification, reconfiguration, refurbishment, and so on.

Each of the process steps of exemplary method 630 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 24, the aircraft 650 produced by exemplary method 630 may include an airframe 652 with a plurality of high-level systems 654 and an interior 656. Examples of high-level systems 654 may include one or more of a propulsion system 658, an electrical system 660, a hydraulic system 662, and an environmental system 664. Any number of other systems may be included. Although an aerospace example is shown, the principles of the disclosure may be applied to other industries, such as the marine and automotive industries.

Apparatus, systems and methods embodied herein may be employed during any one or more of the stages of the aircraft manufacturing and service method 630. For example, components or subassemblies corresponding to production process may be fabricated or manufactured in a manner similar to components or subassemblies produced while the aircraft 650 is in service. Also, one or more apparatus embodiments, method embodiments, or a combination thereof may be utilized during the production stages 632 and 634, for example, by substantially expediting assembly of, or reducing the cost of, an aircraft 650. Similarly, one or more of apparatus embodiments, method embodiments, or a combination thereof may be utilized while the aircraft 650 is in service, for example and without limitation, for maintenance and service 644 of the aircraft.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for using an insert that comprises (a) a housing defining a cavity, (b) an aperture defined in a first end of the housing to the cavity, (c) a semi-spherical portion defined at a second end of the housing, (d) a pair of vent openings defined on opposing sides of the first end of the housing and (e) a pair of receptacles coupled to the first end of the housing, wherein each of the pair of receptacles have sidewalls defining a through-hole and aligned with one of the pair of vent openings, the method comprising:
    installing the insert in a cavity of a panel for an aircraft and advancing the insert until the pair of receptacles rests against an exterior of a skin of the panel;
    injecting an adhesive into one of the pair of vent openings; and
    flowing the adhesive around the housing until the adhesive exits the cavity via the other one of the pair of vent openings.

2. The method of claim 1, wherein the insert further comprises (f) a plurality of retention protuberances coupled to and extending radially from the first end of the housing; and
    wherein installing the insert in the cavity of the panel for the aircraft comprises snapping the retention protuberances past the exterior of the skin to the cavity of the panel.

3. The method of claim 1, further comprising:
    applying a force to the pair of receptacles; and
    separating the pair of receptacles from the housing.

4. The method of claim 3, wherein applying a force to the pair of receptacles comprises rotating the pair of receptacles thereby severing a thinned section between the pair of receptacles and the first end of the housing.

5. The method of claim 1, wherein the insert further comprises (f) a planar flat defined on the semi-spherical portion of the second end of the housing and arranged opposite to the aperture; and
    wherein installing the insert in the cavity of the panel for the aircraft comprises resting the planar flat against a bottom of the cavity.

6. The method of claim 1, wherein flowing the adhesive around the housing includes an outward potting flow of the adhesive with pressure directed radially.

7. A method for using an insert that comprises (a) a housing defining a cavity, (b) a first aperture defined in a first end of the housing to the cavity, (c) a semi-spherical portion defined at a second end of the housing, (d) a pair of vent openings defined on opposing sides of the first end of the housing and (e) a second aperture defined in a second end of the housing and aligned with a central axis of the semi-spherical portion, the method comprising:
    installing the insert in a cavity of a panel for an aircraft;
    placing a tip of an adhesive gun through the first aperture and the cavity of the housing to the second aperture of the housing;
    injecting an adhesive underneath the semi-spherical portion of the insert; and
    flowing the adhesive around the housing until the adhesive exits the cavity of the panel via the pair of vent openings.

8. The method of claim 7, wherein the insert further comprises (f) a plurality of retention protuberances coupled to and extending radially from the first end of the housing; and
    wherein installing the insert in the cavity of the panel for the aircraft comprises snapping the retention protuberances past an exterior of a skin to the cavity of the panel.

9. The method of claim 7, wherein the insert further comprises (f) a planar flat defined on the semi-spherical portion of the second end of the housing and arranged opposite to the first aperture; and
    wherein installing the insert in the cavity of the panel for the aircraft comprises resting the planar flat against a bottom of the cavity.

10. The method of claim 7, wherein placing the tip of the adhesive gun through the first aperture and the cavity of the housing to the second aperture of the housing further comprises the tip of the adhesive gun engaging a receptacle defined by the second aperture.

11. The method of claim 7, wherein the insert further comprises (f) a pair of receptacles defined on opposing sides of the first end of the housing, the method further comprising:
    applying a force to the pair of receptacles; and
    separating the pair of receptacles from the housing.

12. A method for using an insert that comprises (a) a housing defining a cavity, (b) an aperture defined in a first end of the housing to the cavity, (c) a semi-spherical portion defined at a second end of the housing, (d) a pair of vent openings defined on opposing sides of the first end of the housing and (e) a pair of helical grooves defined on an exterior of the semi-spherical portion of the housing, the method comprising:
    injecting an adhesive into a cavity of a panel of an aircraft;
    installing the insert in the cavity of the panel; and
    flowing the adhesive around the housing and along the pair of helical grooves until the adhesive exits the cavity of the panel via the pair of vent openings.

13. The method of claim 12, further comprising:
    twisting the insert in the cavity of the panel.

14. The method of claim 12, wherein the insert further comprises (f) a rigid tab coupled to the first end of the housing; and
    wherein installing the insert in the cavity of the panel for the aircraft comprises pressing the insert into the cavity of the panel until the rigid tab rests against an exterior of a skin of the panel.

15. The method of claim 14, further comprising:
setting the adhesive in the cavity of the panel;
applying a force to an underside of the rigid tab after the adhesive has set; and
separating the rigid tab from the housing.

16. The method of claim 12, wherein the insert further comprises (f) a pair of receptacles defined on opposing sides of the first end of the housing, the method further comprising:
    applying a force to the pair of receptacles by rotating the pair of receptacles thereby severing a thinned section between the pair of receptacles and the first end of the housing; and
    separating the pair of receptacles from the housing.

17. The method of claim 12, wherein injecting the adhesive into the cavity of the panel of the aircraft comprises injecting a predetermined amount of the adhesive based on a volume of the cavity of the panel and a volume of the insert.

18. The method of claim 12, wherein injecting the adhesive into the cavity of the panel of the aircraft comprises filling the cavity to a predetermined height.

19. The method of claim 12, further comprising:
overfilling the cavity and causing the adhesive to spill out of the pair of vent openings thereby signaling the insert is properly seated within the cavity.

20. The method of claim 12, wherein the insert further comprises (f) a plurality of retention protuberances coupled to and extending radially from the first end of the housing; and
    wherein installing the insert in the cavity of the panel for the aircraft comprises snapping the retention protuberances past an exterior of a skin to the cavity of the panel.

\* \* \* \* \*